Figure 11:
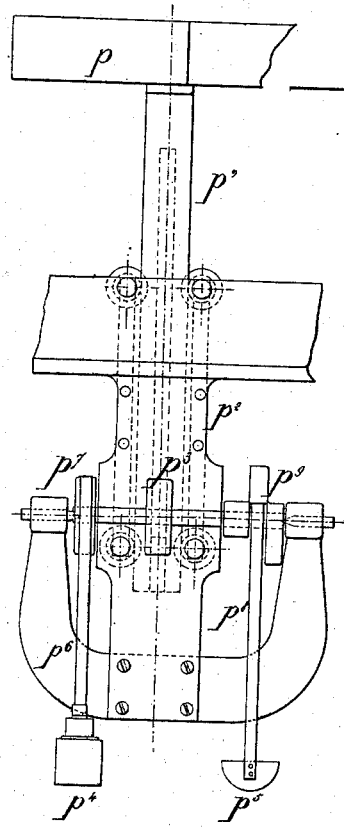

(No Model.) 9 Sheets—Sheet 1.
A. DURET.
MACHINERY FOR EDGING OR BORDERING LETTER PAPER, &c.
No. 268,786. Patented Dec. 12, 1882.
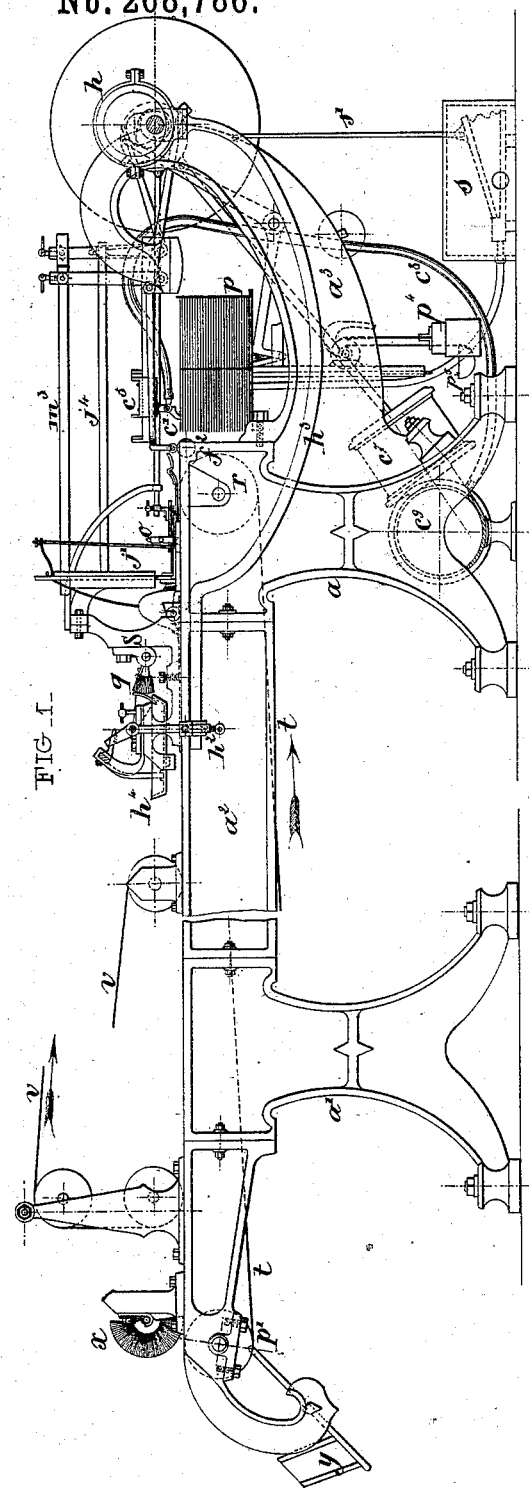
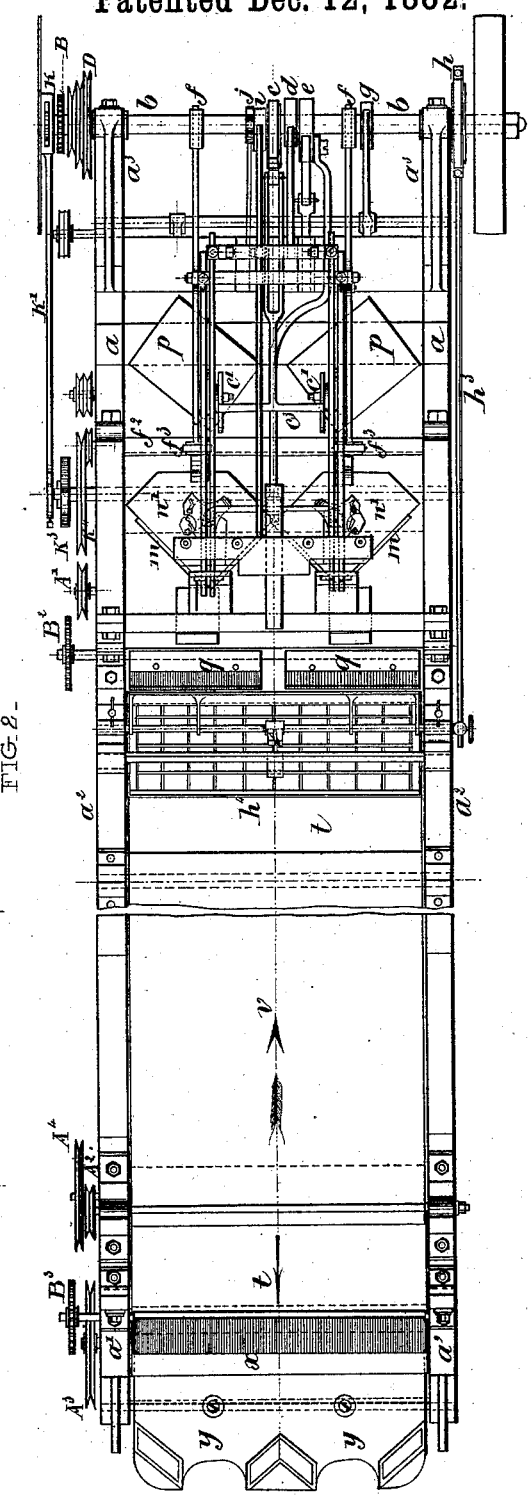

(No Model.)   9 Sheets—Sheet 2.
A. DURET.
MACHINERY FOR EDGING OR BORDERING LETTER PAPER, &c.
No. 268,786.   Patented Dec. 12, 1882.
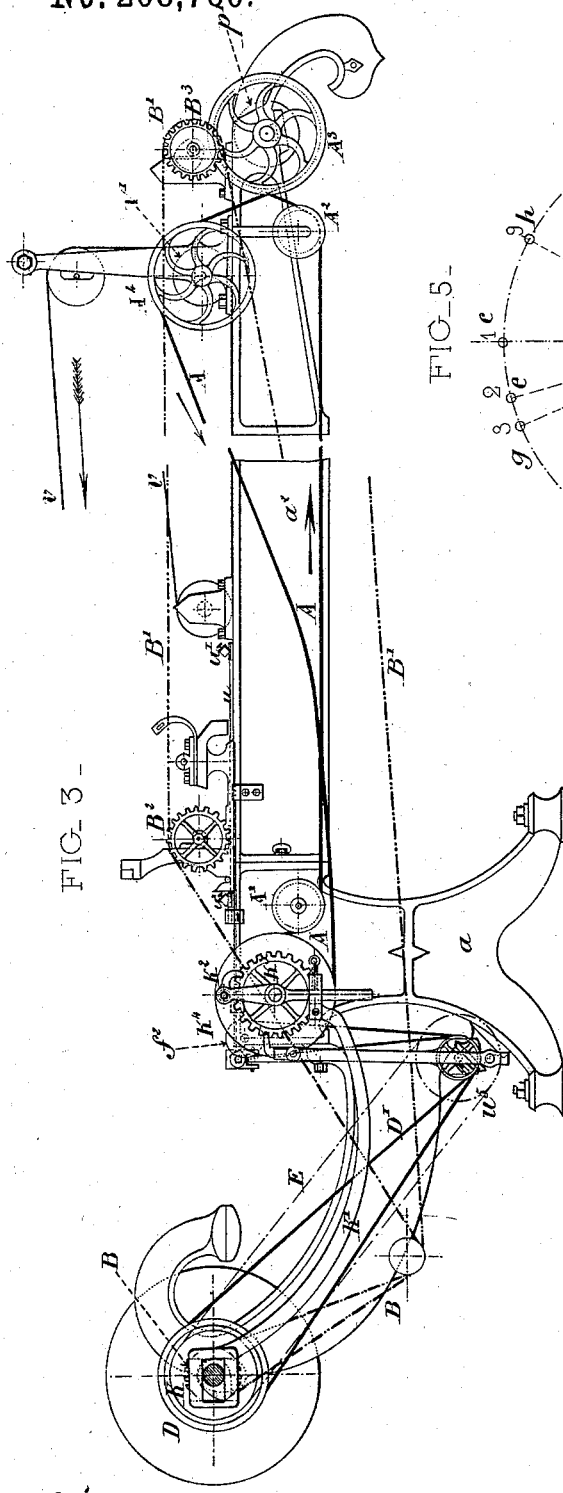
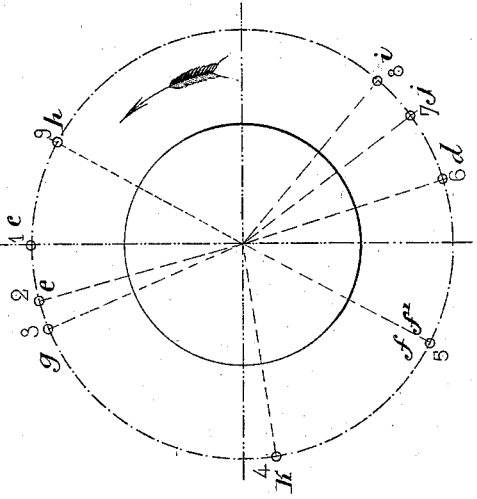
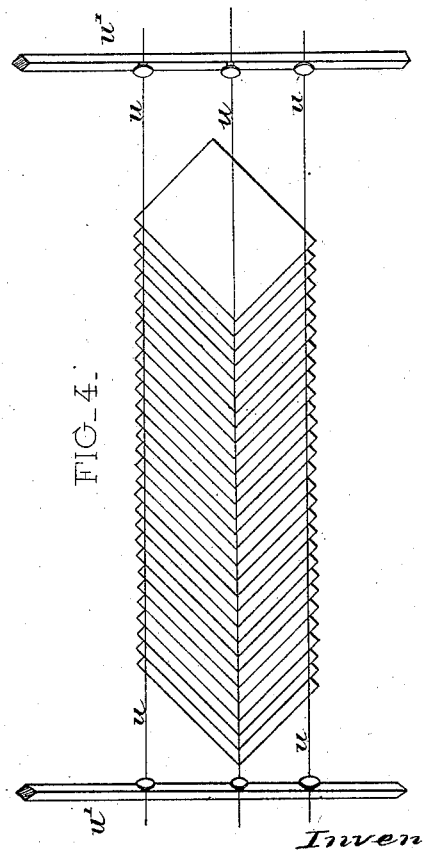
Witnesses:
John C. Tunbridge
John W. Speer
Inventor
Achille Duret
by his attorneys
Briesen & Betts

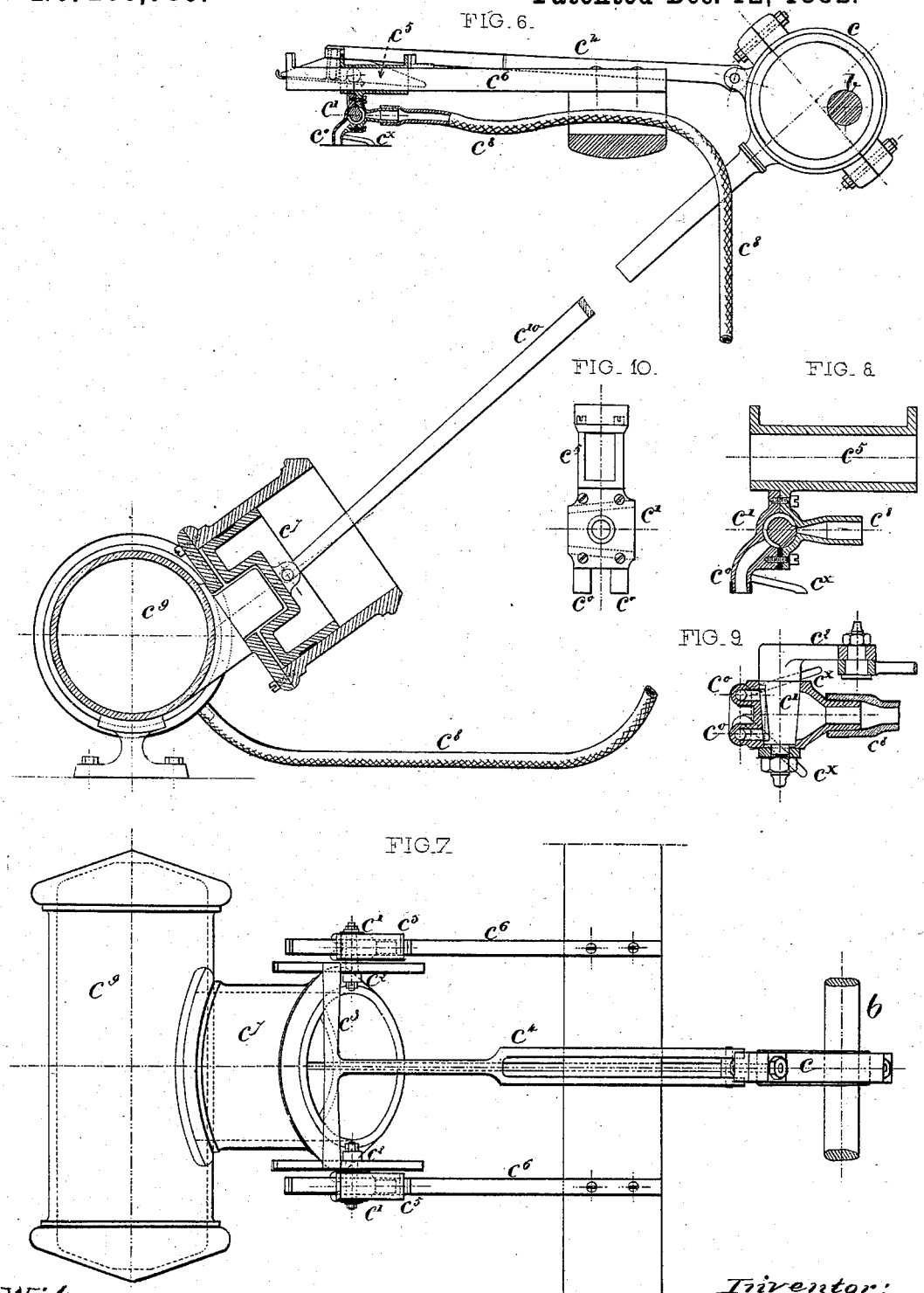

(No Model.) 9 Sheets—Sheet 4.

A. DURET.
MACHINERY FOR EDGING OR BORDERING LETTER PAPER, &c.

No. 268,786. Patented Dec. 12, 1882.

Witnesses:
John C. Tunbridge
John M. Speer

Inventor
Achille Duret
by his attorneys
Briesen & Betts (No Model.) 9 Sheets—Sheet 5.
A. DURET.
MACHINERY FOR EDGING OR BORDERING LETTER PAPER, &c.
No. 268,786. Patented Dec. 12, 1882.
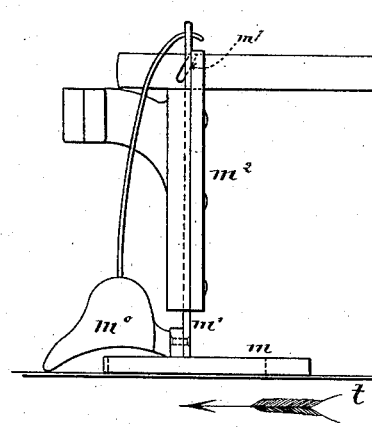
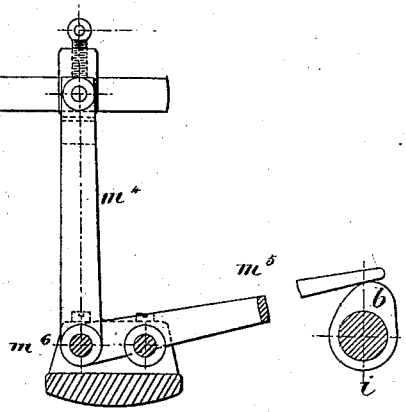
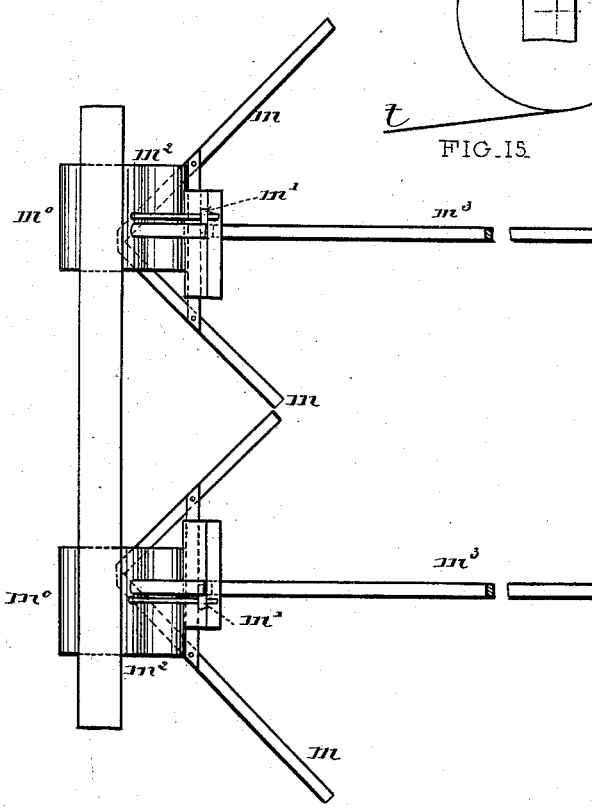
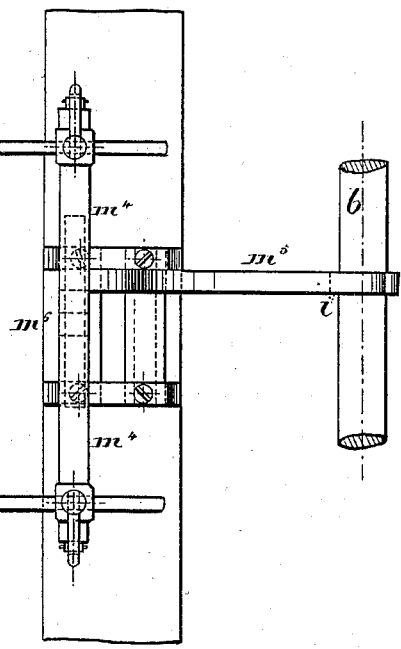
Witnesses
John C. Tunbridge
John M. Speer.
Inventor:
Achille Duret
by his attorneys
Briesen & Betts (No Model.) 9 Sheets—Sheet 6.
A. DURET.
MACHINERY FOR EDGING OR BORDERING LETTER PAPER, &c.
No. 268,786. Patented Dec. 12, 1882.
FIG. 17.
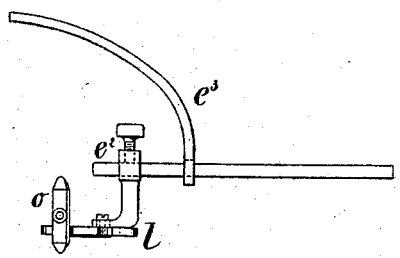
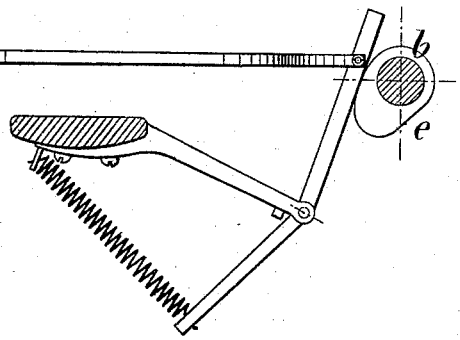
FIG. 18.
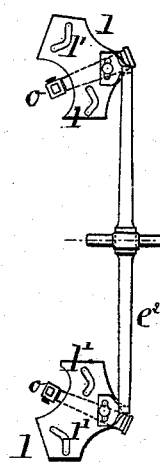
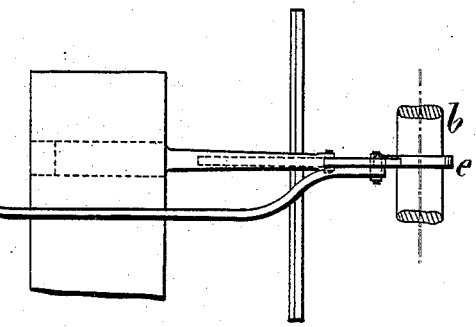
FIG. 19.
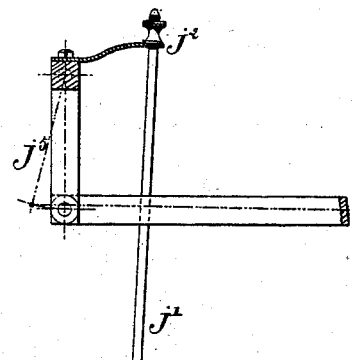
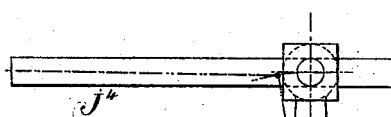
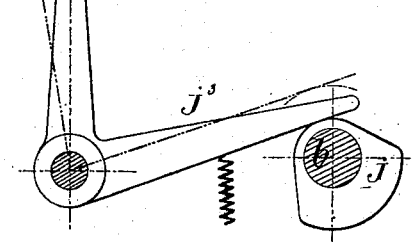
Witnesses
John C. Tunbridge
John M. Speer
Inventor
Achille Duret
by his attorneys
Briesen & Betts
N. PETERS, Photo-Lithographer, Washington, D. C.

(No Model.) 9 Sheets—Sheet 7.
A. DURET.
MACHINERY FOR EDGING OR BORDERING LETTER PAPER, &c.
No. 268,786. Patented Dec. 12, 1882.
FIG. 20.
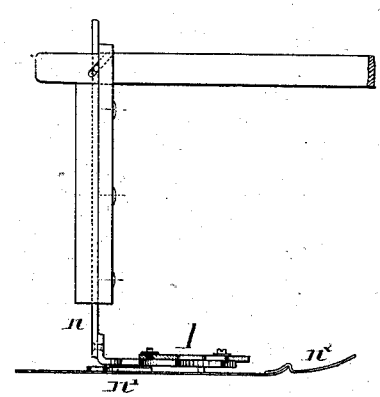
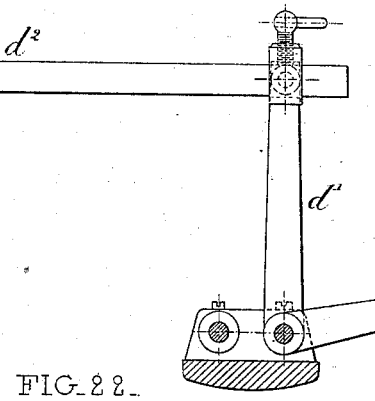
FIG. 22.
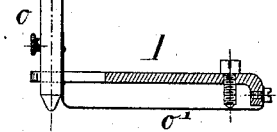
FIG. 21.
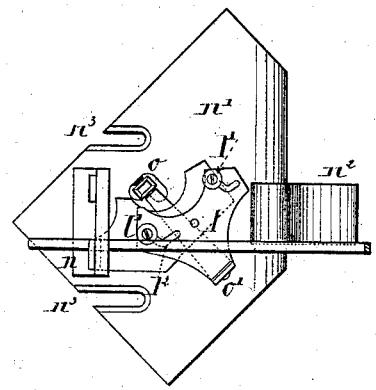
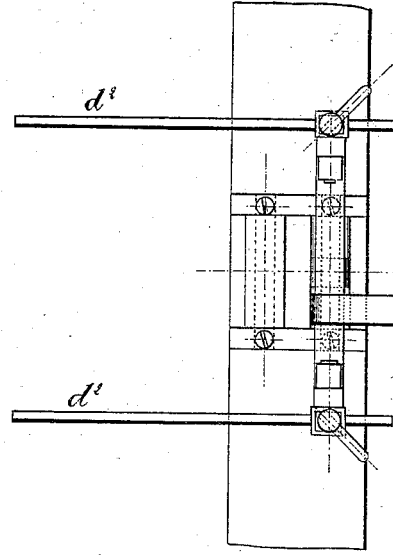
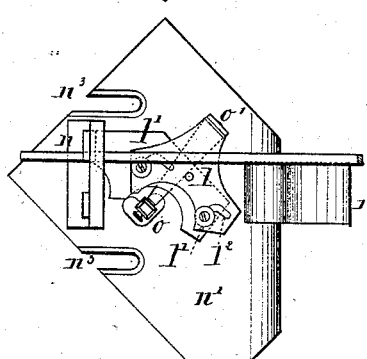
FIG. 33. FIG. 34.
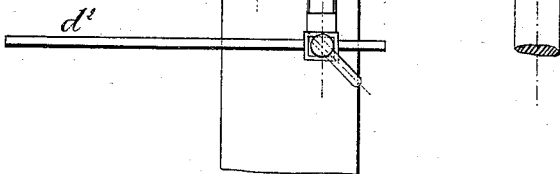
Witnesses
John C. Tunbridge
John M. Speer
Inventor
Achille Duret
by his attorneys
Briesen & Betts
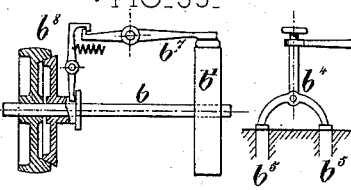
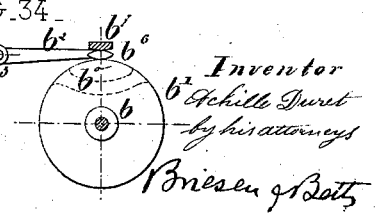
N. PETERS, Photo-Lithographer, Washington, D. C.

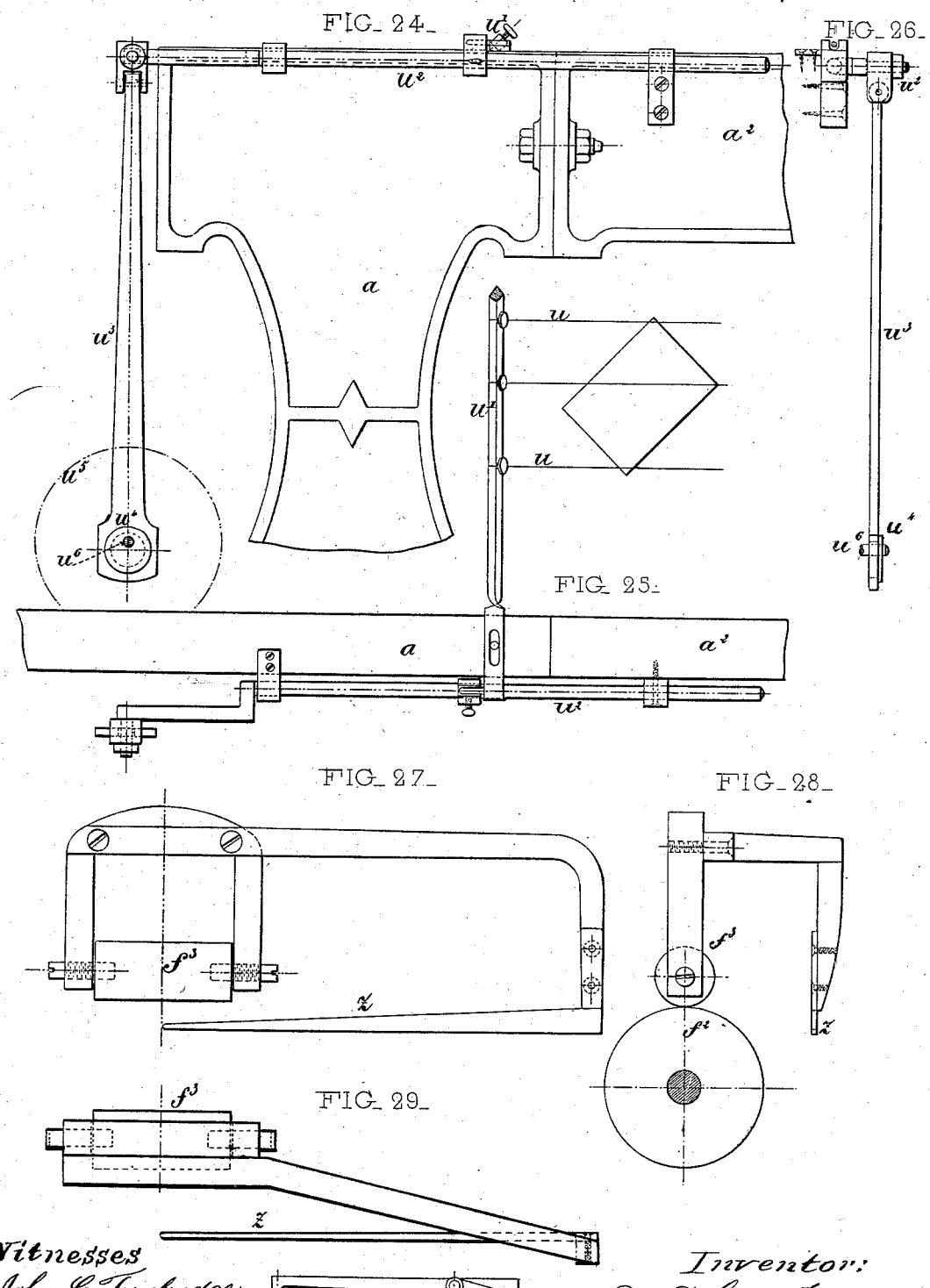

(No Model.)  9 Sheets—Sheet 9.
A. DURET.
MACHINERY FOR EDGING OR BORDERING LETTER PAPER. &c.
No. 268,786.  Patented Dec. 12, 1882.
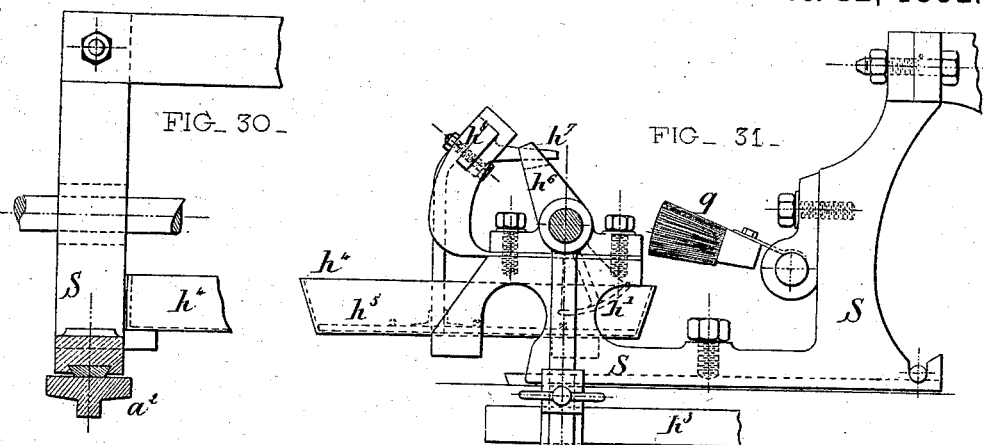
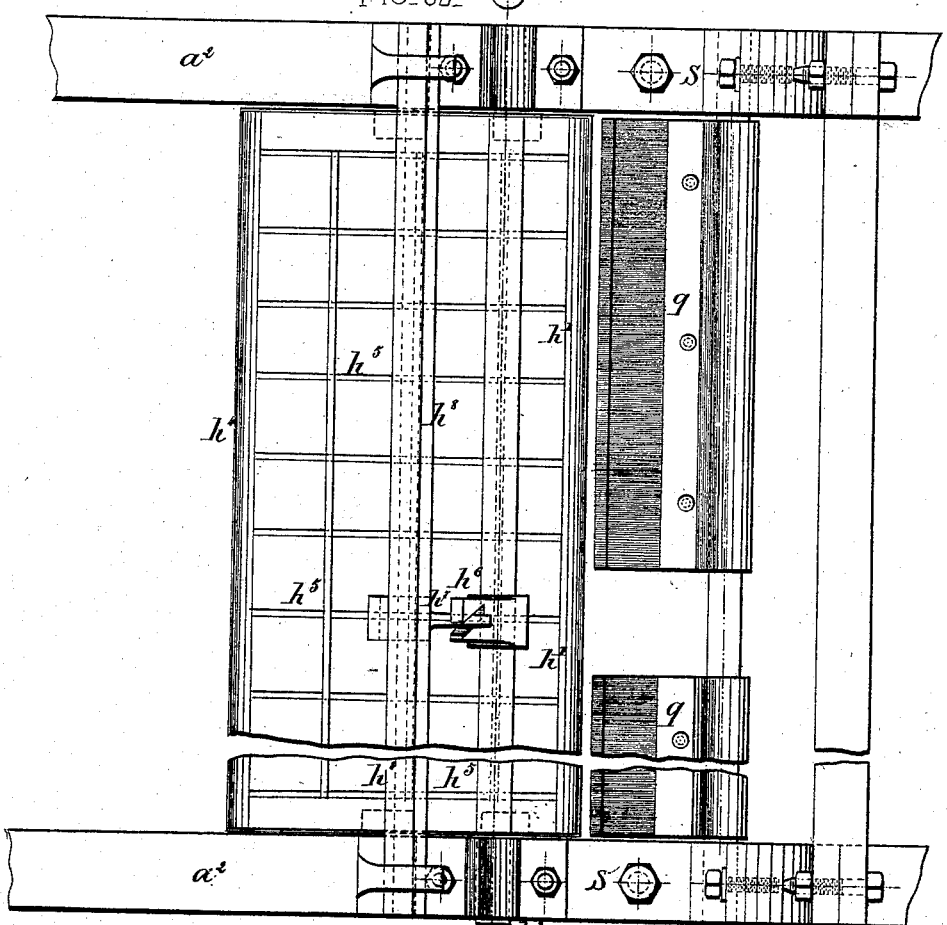
Witnesses
John C. Tunbridge.
John M. Speer.
Inventor
Achille Duret
by his attorneys
Briesen & Betts
N. PETERS, Photo-Lithographer, Washington, D. C.

UNITED STATES PATENT OFFICE.

ACHILLE DURET, OF VEUZE, NEAR ANGOULÊME, FRANCE.

MACHINERY FOR EDGING OR BORDERING LETTER-PAPER, &c.

SPECIFICATION forming part of Letters Patent No. 268,786, dated December 12, 1882.

Application filed August 24, 1882. (No model.) Patented in France December 24, 1880, No. 140,343; in Belgium January 17, 1881, No. 53,597; in England January 20, 1881, No. 236, and in Germany January 24, 1881, No. 14,752.

*To all whom it may concern:*

Be it known that I, ACHILLE DURET, a citizen of France, residing at Veuze, near Angoulême, in the department of Charente, in the French Republic, have invented certain new and useful Improvements in Machinery for Edging or Bordering Letter-Paper, Envelopes, Visiting and other Cards in either Black or Colors, for which I have received the following Letters Patent: French Letters Patent, for fifteen years, dated December 24, 1880, No. 140,343; Letters Patent of Belgium, for fifteen years, dated January 17, 1881, No. 53,597; Letters Patent of England, for fourteen years, dated January 20, 1881, No. 236; and Letters Patent of Germany, for fifteen years, dated January 24, 1881, No. 14,752; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The machine for bordering paper, envelopes, cards, &c., embodying my invention is essentially novel in the following respects:

First, in that all the successive operations, commencing with presenting the paper to the machine and its taking the sheet to be edged or bordered up to the inking of the sheet, are mechanically performed under special conditions. The operative attending the working of the machine has merely to be watchful.

Second, in the applications of and limitation of color on the borders of the sheets, the edge of each sheet being restricted in breadth by the sheet which is placed above it.

Third, in the mechanical combinations, which in their principle as well as their detail constitute the characteristic features on which I base my claim.

Figure 12:
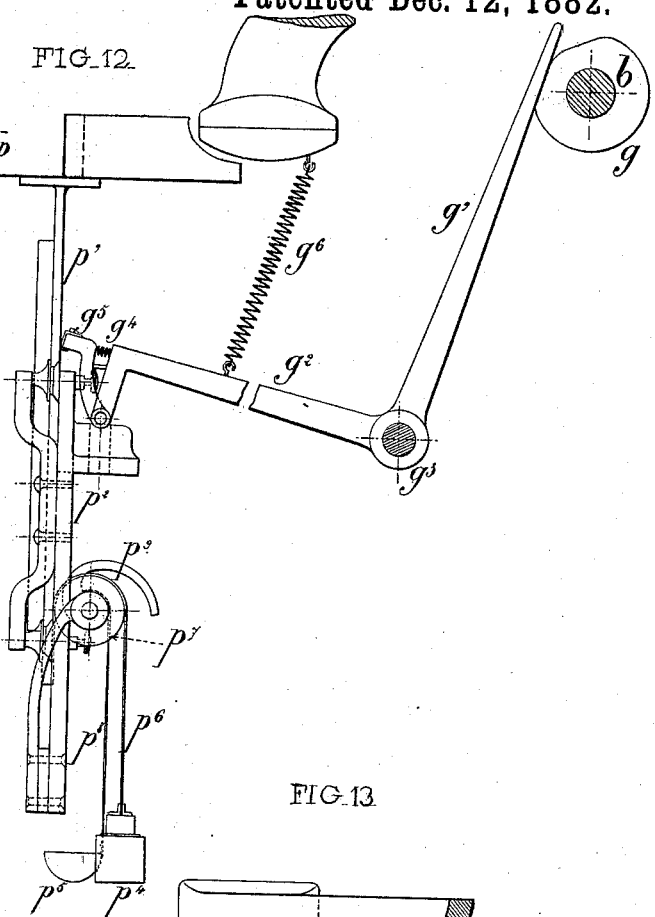
Figure 13:
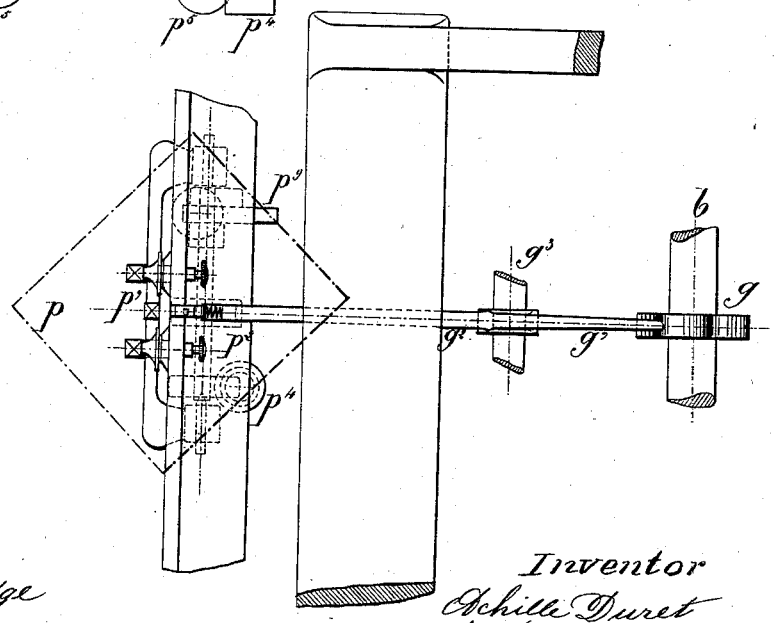

Figure 1 is a side elevation of the machine, Fig. 2 being a plan thereof. Fig. 3 is a lateral elevation, seen from the side of motion transmission. Fig. 4 shows how the machine arranges the superposition of the sheets, leaving the width only of paper it is required to color. Fig. 5 is a plan showing the keying of the cams on the driving-shaft. Figs. 6 and 7 show in vertical section and in plan the suction mechanism for drawing the sheets and the air-pump for producing the necessary vacuum for actuating this mechanism. Figs. 8, 9, and 10 are details of the suction apparatus. Figs. 11, 12, 13 show the mechanism which acts on the plate supporting the sheets to be edged in order that this plate shall present the first sheet (taken by the machines suction apparatus) at a constant and determined height. Figs. 14, 15, and 16 are details showing the movements of the lifters or triangular sheet-holders. Figs. 17, 18 are a plan and elevation of the touchers or fingers. Fig. 19 shows the transmission of motion to the pressers of the bordered sheets while they are being removed. Figs. 20, 21, 22 are details showing the movements of the edging-plates, combined with the movement of the touchers. Figs. 24, 25, 26 are details showing the transmission of motion to the wires which press the bordered sheets. Figs. 27, 28, 29 show in three views the details of the mechanism for lowering the corner of the edged or bordered sheet at the moment the next sheet is thrown forward, and which in its turn is bordered by the same movement the sheet is thrown forward, and in its turn is edged by the same means and movement. Figs. 30, 31, 32 are a transverse, lateral, and plan view of the mechanism for making the borders of different widths with the same machine. Figs. 33 and 34 are views showing the means for stopping the machine in case of accident in distributing the sheets.

The frame of the machine here represented edges or borders two sheets at a time, the sides of which, $a\ a'$, are of cast-iron, and two to each end, which unite two girders, $a^2$, also of cast-iron, and which are made sufficiently long to allow of drying the paper when colored in best condition. The anterior sides, $a$, are made to receive the arched supports $a^3$, which terminate in blocks in which the driving-shaft $b$ turns, and which are arched to leave free access to the plates bearing the piles of paper to be edged or bordered. The driving-shaft $b$ has a fixed and loose pulley in front, which is rendered solid instantaneously from any part of the machine by a coupling mechanism. On this shaft $b$ are arranged the cams or eccentrics $c$, $d$, $e$, $f$, $g$, $h$, $i$, $j$, $f'$, and $k$.

The eccentric $c$, placed in the longitudinal axis of the machine, governs the whole of the mechanism, which takes the sheets one by one from the plates $p\ p$ and distributes them to the following organs: This mechanism comprises two three-way taps, $c'$, one for each of the piles of sheets, and simultaneously actuating the keys $c^2$ of these taps, being connected at the head $c^3$ of the eccentric-bar $c^4$. The taps $c'$ are solid, with the pieces $c^5$ fitted with gentle friction on fixed slides $c^6$. The keys $c^2$ are fitted with firm friction, so that the eccentric-bar draws the taps $c'$ and pieces $c^5$ until the latter rest against stops judiciously arranged in front and rear. When the pieces $c^5$ return toward the shaft $b$, and when they encounter the projection, the eccentric, which is not at the end of its course, turns the key $c^2$, which then puts the tap $c'$ in communication with the air-suction pump $c^7$ by means of the flexible tube $c^8$. When, on the contrary, the pieces $c^5$ separate from the shaft $b$, they encounter another extreme projection. The eccentric then turns the key $c^2$ at the opposite side and puts the tap $c'$ in communication with the atmosphere. In the first case the taps each draw a sheet by suction, and in the second case, after having borne these sheets a certain distance, they abandon them to two drawing-rollers, hereinafter described. The pump $c^7$, with vacuum $c^9$, is actuated by the same eccentric $c$ whose bar $c^{10}$ is articulated directly on the piston. The taps $c'$ have one or two suction-tubes, $c^0$, to which are branched others, $c^x$, whose object is to lift the sheet by suction at several points. At the moment of suction the taps $c'$ are just above the plates $p\ p$, on which the sheets to be edged are placed in piles. As fast as the machine works the pile diminishes, and in order that these plates present the top sheet always at the same height they are arranged and moved as follows:

In referring to the Figs. 1, 2, 11, 12, 13 it will be seen that the plates $p$ are fixed on a slide, $p'$, guided in a slide, $p^2$, and the roller $p^3$. The slide $p'$ is submitted to the action of two counter-weights, $p^4\ p^5$, the one, $p^4$, attached to the slide by its suspending organ, $p^6$, balances (in passing to the roller $p^7$, which belongs to the axis of the roller $p^3$) all the weight of the plate and its accessories and of the slides, while that $p^5$ is intended to balance the weight of the sheets of paper.

With the object of regulating its action in accordance with the variable weight of the sheets, the weight $p^5$ is suspended at the end of a steel band, $p^8$, which is applied to a surface bent in an Archimedean-screw form, $p^9$. The plates and their piles of sheets thus equipoised are lifted for taking each sheet by aid of a lever, $g'\ g^2$, oscillating at $g^3$ under the influence of the cam $g$. The arm $g^2$ ends in a kind of jointed V, and having a spring, $g^4$, which attacks by friction (with the aid of the extreme and movable part $g^5$) the slide $p'$. A spring, $g^6$, compels the arm $g^2$ to constantly follow the movements of the cam $g$. The sheets, taken one by one by the suckers $c'$, are transported by these apparatus as far as to a roller, $f^2$, which turns with a continuous and rapid motion, and which is surmounted by two small rollers, $f^3$, presenting themselves, respectively, above the course taken by the sheets of paper. These rollers $f^3$ are lifted when the suction-taps $c'$ separate from the shaft $b$ with the sheets sucked or drawn by suction; but as soon as these sheets are abandoned the india-rubber rollers $f^3$ are lowered, and, pressing on the roller $f^2$, compel the sheets to pass quickly between them, to be projected in the marginers. The rollers $f^3$ turn loosely in blocks $f^4$, which support the bar $f^5$ of the levers oscillating at $f^7$, and receiving at the other end, $f^6$, the effects of the action of the cams $f\ f'$ of the shaft $b$. The sheets launched forward by the rollers $f^2\ f^3$ fall into the triangles $m$, which are lowered in this movement onto an endless band, $t$, Figs. 1, 2, 14, 15, 16. These triangles are at the lower ends of the rods $m'$, which slide in the supports $m^2$ and reappear above to come into communication with other rods, $m^3$, that an angular lever, $m^4\ m^5$, oscillating at $m^6$, animates with a rectilinear and alternate motion.

The cam $i$ is shaped to produce the requisite displacements of the lever $m^4\ m^5$ and rods $m^3$. These latter are cut with a groove, $m^7$, in which is adjusted a projection, $m^8$, of the rods $m'$, so that the rectilinear sliding motion of rods $m^3$ are transformed on the rods $m'$ into a corresponding up-and-down motion. The triangles are weighted at $m^0$ for bringing them into the lower position, and exercise their pressure on the paper edged, so that the brush that blacks them does not otherwise interfere with them. In the same supports, $m^2$, the rods $n$ (which bear at the lower part the plates $n'$) slide in a vertical direction. (See Figs. 20, 21, 22.) Other rods, $d^2$, connected to the lever $d'$ of the cam $d$, cause the rods $n$ to move in an alternate and rectilinear manner, the same as the slides $m'$. The plates $n'$ are furnished in front with a part, $n^2$, intended to direct the sheets launched by the rollers $f^2\ f^3$ under these said plates $n'$. They are, moreover, covered with other and smaller plates, $l$, which hold to the first by tenons or projections $l'$, traversing curvilinear spaces $l^2$ of the plates $l$. These latter are fixed to the head $e^2$ of the eccentric rod or bar $e'$ and eccentric $e$, Figs. 17, 18. Each one bears a toucher, $o$, Fig. 22, which is mounted on the elastic arm $o'$ and traverses the plate $n'$. The eccentric-bar $e'$ is maintained by the support $e^3$ solid with the vertical displacements of the rods $n$. The triangles $m$ and the plates $n'$ and $l$ have movements, which are combined in the following manner: When the sheets are projected by the rollers $f^2\ f^3$ the triangles $m$ are at the bottom of the descending course and the plates $n'$ and $l$ above the ascending course. The sheets consequently encounter the sides of the triangles. The plates $n'$ descend to allow the fallers $o$ to press on the projected sheets. At this juncture the eccentric $e$ pushes the plates $l$, and by aid of the curvilinear mortises $l'$ these plates are directed, with their touchers, first to one side of the angle $m$ then toward the other, the effect being to place the sheet exactly within the angles of the triangles $m$. Then it is that the plate $l$ rises, then the triangle $m$, and lastly the endless cloth $t$ is displaced for drawing along the sheets which have been edged or bordered. To this mechanism is added the pressers $j'$, two for each of the sheets of paper, Fig. 19. They consist of small metal shafts, whose lower end, covered with india-rubber, cork, or other suitable matter, is guided in the openings $n^3$ of the plate $n'$, and whose upper end, fitted loosely in the apertures of a support, $j^2$, rises with the said support, which oscillates under the influence of the cam $j$ and the motion-transmitters $j^3 j^4 j^5$. These pressers press the bordered or edged sheet and keep it in position during the longitudinal displacement of the endless cloth $t$, which displacement is intermittently performed with the guides $t'$ $t^2$, in the manner hereinafter explained. Above the triangles $m$ the sheets are inked by aid of a brush, the segment of a circle, which at each turn is supplied with ink by contact with a metal sector, $h'$, which moves in an oscillating manner by connection with the crank $h^2$, keyed on the axis of the sector, with the bar $h^3$ of the eccentric $h$. At the bottom of the ink-holder $h^4$ an agitating-grating, $h^5$, is placed, which this mechanism animates with a continuous backward and forward motion by transforming in this manner the oscillating motion of a sort of crank, $h^6$, keyed on the shaft of the sector, and in the center by the medium of a tongue, $h^7$, belonging to a traverse, $h^8$, to which the grating $h^5$ is connected. The connection of the eccentric-bar $h^3$ and the lever $h^2$ can be varied, as required, for giving and varying the amplitude of the oscillations of the inking-sector. The brush and inking mechanism are mounted on supports S, which can be moved on the traversers $a^2$ of the frame, so that all this part of the bordering mechanism can be brought up or kept away, so as to allow of different forms of bordering being made.

To prevent the inked or edged sheets smearing at the edges, they are held by two wires, $u$, stretched upon and applied to these sheets for a sufficient distance, and in order that the brush deposits color where the wires are these latter have an alternate transverse motion communicated to them. For this purpose the first traverse, $u'$, to which these wires are attached, has a transverse backward and forward motion imparted from a secondary shaft, $u^2$, with crank, which receives the oscillations of a bar, $u^3$, of an eccentric, $u^4$, which turns with a loose pulley, $u^5$, of the axis $u^6$. On the other side of the pressers the sheets engage (by always following the endless cloth $t$) under another endless cloth of metal, $v$, whose object is to press the bordered sheets all the time they move, during which the drying takes place.

This drying is either naturally or artificially performed by using one or more driers, gas-jets, or by other means placed above or below the cloth $v$. The dried sheets are brushed on leaving the cloth $v$ by aid of the brush $x$. During the final operation, which is intended to burnish, the ink-pressers rest on the sheets to maintain the regularity of the edging. After the brushing by the brush $x$ the sheets fall into the compartments of a box, $y$, where a child collects them.

*Transmission of motion.*—The movement of the shaft $b$, besides the eccentrics $c\, d\, e\, f\, g\, h\, i\, j\, f'$, already mentioned, is transmitted to the endless cloth $t$ by an eccentric, K, of the rod $K'$ and click $K^2$, working in the ratchet $K^3$. To this ratchet $K^3$ is keyed the pulley $K^4$, which, by an endless cord, A, returns this movement to the rollers $r\, r'$ of the cloth $t$, and to that $v'$ of the metal cloth $v$. $A'\, A^3\, A^3\, A^4$ are rollers and pulleys of the cord A. The click $K^2$, describing varying oscillations, permits of modifying the displacements of the endless sheets or cloths $t$ and $v$, and so alters the breadths of the borders of the sheets. At the side of the eccentric K the shaft $b$ bears a pinion, B, which communicates motion by the endless chain $B'$ to the pinions $B^2$ $B^3$ of the inking-brush and polisher $x$. By means of the piece D and endless cord $D'$ continuous motion is communicated to the shaft $f^2$, and by another endless cord, E, it actuates the eccentric pulley $u^5$ of the shaft of the wire-pressers $u$.

*Action of the machine.*—It has already been described how the sheets, piled on the plates $p$, are always presented at the height of the suckers $c'$, how these bear the sheets to the rollers $f^2 f^3$, and how the latter project them anglewise into the triangles $m$. The movement of the fingers or touchers $o$ for regulating the margin in the triangles $m$. This being effected these fingers, as well as the triangle $m$, rise, and the endless chain $t$ is displaced in proportion corresponding with the width of border. Then the triangles redescend to margin another sheet, which is above the first, so as to form a continuous superposition of the sheets in stages one on the other, as shown in Fig. 4. It is in this condition that the sheets receive the ink and are dried naturally or artificially, being pressed and passing between the endless cloths $t$ and $v$, being then brushed and burnished by the brush $x$, finally reaching the box $y$, where they are collected, after which the other sides of these same sheets are edged in the same manner and by the same means. When the sheets are double, and when the angle opposite the fold of the paper is presented, the suction apparatus is used to separate the sheets at the moment of suction by producing in this angle a jet of air from a bellows at the head of the machine, driven by a shaft, $s'$, jointed to the bar $h^3$ of the eccentric $h$. The rollers $f^3$ are furnished with shafts $z$, Figs. 27, 28, 29, which in descending with these rollers lay down the corner of the margined sheet when the next sheet to be bordered is projected, so as to prevent its inserting itself below the already-bordered sheet.

Fig. 5 is a plan of the keying of the eccentrics. The letters of reference sufficiently explain the relative positions of these organs, the action of which has already been explained.

A stop and safety mechanism can be adapted to the machine, so as to arrest its motion automatically when a sheet is badly placed or should it fail to reach the marginers. Figs. 33, 34 represent this mechanism. On the driving-shaft $b$ a cam, $b'$, is placed, with double curve. A lever, $b^2$, oscillating at $b^3$, bears a small balance, $b^4$, the arms of which are opposite the two holes $b^5$ of the table or the plates $n$ $n'$. These holes are closed when the sheet is properly bordered in the triangles $m$; but if this sheet is badly placed, or if it does not reach the triangles, the balance $b^4$ falls and obliges the lever $b^2$ to follow the small eccentric $b^0$ of the cam $b'$. At the end $b^6$ of the lever $b^2$ another lever, $b^7$, rests, which is held hooked to the uncoupling-lever $b^8$ as long as the end $b^6$ follows the large eccentric $b'$; but when this end slides on the small eccentric $b^0$, which occurs when the sheet is badly bordered, the unhooking of $b^7$ and $b^8$ takes place, the unlocking of the friction-pulleys of the shaft $b$ is immediately effected, and the machine stands still.

Having thus described my invention and the mode of carrying it into effect, I claim—

1. The combination of the taps $c'$, suction-tubes $c^0$ $c^x$, and keys $c^2$ with the head $c^3$, actuating bar $c^4$, friction-pieces $c^5$ $c^6$, pump $c^7$, and pipe $c^8$, substantially as herein shown and described.

2. The plate $p$ and stem $p'$, combined with guide $p^2$, roller $p^3$, weights on shaft of same, lever $g'$ $g^2$, movable piece $g^5$, and cam $g$, substantially as herein shown and described.

3. The roller $f^2$, combined with the elastic rollers $f^3$, blocks $f^4$, bar $f^5$, and cam $f$, substantially as herein shown and described.

4. The triangles $m$, having weights $m^0$, combined with band $t$, rod $m'$, having projection $m^8$, supports $m^2$, rods $m^3$, having grooves $m^7$, and lever $m^4$ $m^5$, substantially as herein shown and described.

5. The rod $n$, plate $n'$, and raised part $n^2$, combined with rod $d^2$, plate $l$, tenons $l'$, rod $e'$, having head $e^2$, toucher $o$, and arm $o'$, substantially as herein shown and described.

6. The combination of the plate $n'$, having openings $n^3$, with the pressers $j'$, supports $j^2$, and mechanism, substantially as herein described, for moving said supports, as set forth.

7. The combination of the ink-vessel $h^4$ and grating $h^5$ with the sector $h'$, crank $h^2$, rod $h^3$, crank $h^6$, and traverse $h^8$, having tongue $h^7$, substantially as herein shown and described.

8. The combination of the ink-vessel $h^4$, grating $h^5$, and mechanism, substantially as described, for actuating the same, with the movable supports $s$ and traverses $a^2$, substantially as specified.

9. The wires $u$, combined with traverses $u'$, and mechanism, substantially as described, for moving the same backward and forward, as specified.

10. The combination of the endless cloth $t$ and mechanism, substantially as described, for moving the same, with the endless metal cloth $v$, substantially as specified.

11. The combination of the carrying-cloth $t$ and endless metal cloth $v$ with the drying-jet applied to said metal cloth, substantially as specified.

ACHILLE DURET.

Witnesses:
A. BLÉTRY,
ROBT. M. HOOPER.